Nov. 2, 1948.  R. V. ANDERSON  2,452,537
APPARATUS FOR AUTOMATICALLY CONTROLLING
DURATION OF ELECTRICAL CURRENT

Filed April 10, 1946  2 Sheets-Sheet 1

Inventor
RALPH V. ANDERSON

By M. A. Hayes

Attorney

Nov. 2, 1948.                R. V. ANDERSON                    2,452,537
                APPARATUS FOR AUTOMATICALLY CONTROLLING
                      DURATION OF ELECTRICAL CURRENT
Filed April 10, 1946                                        2 Sheets-Sheet 2

Inventor
RALPH V. ANDERSON

By M. C. Hayes

Attorney

Patented Nov. 2, 1948

2,452,537

UNITED STATES PATENT OFFICE 2,452,537

APPARATUS FOR AUTOMATICALLY CONTROLLING DURATION OF ELECTRICAL CURRENT

Ralph V. Anderson, United States Navy

Application April 10, 1946, Serial No. 661,041

6 Claims. (Cl. 200—33)

(Granted under the act of March 3, 1883, as amended April 30, 1928; 370 O. G. 757)

The invention relates to a device for automatically controlling the duration of electric current, and more specifically to a device by which the duration of electric current can be selectively chosen.

An object of the invention is to provide a means for the control of the duration of electric current which is of novel and simple construction.

Another object is to provide a selective means for the duration control of said electric current.

Another object is to provide a device by which the control of the duration of electric current is entirely automatic after desired selection of time is made.

Still another object is the provision of a device by which selection of time can be made entirely by sense of touch and will automatically give the desired results.

Other objects and advantages of the invention will be apparent from the following description having reference to the accompanying drawings, which are exemplary, and in which.

The invention comprises apparatus for automatically controlling the duration of an electric current. In various applications it is necessary to supply electric current for a definite length of time. The length of time required, for successive periods of time, however, may vary considerably from a general average. Moreover, the length of time selected must be exact within reasonable limits. In the photographic art, for example, it is especially necessary that electric currents be controlled for a definite length of time and that the length of time selected be variable. It is sometimes further required that complete darkness prevail during the timing.

*General nature and specific use.*—While adaptable to any condition requiring time control of an electric current, the device may, for example, be used with photographic equipment, especially printing devices when a general average of six to eight seconds, with a possible minimum of one second and a maximum of fifteen seconds, timing prevails. Means are provided whereby in using the device, the operator "dials" the amount of time required, and selection of the length of time may be entirely by the sense of touch.

Methods in use heretofore, employ a foot switch with the disadvantage that the operator must observe a sweep-second-hand; or, in some cases, a clock mechanism is employed in which the dial is set for any number of seconds. These methods require the use of the eyes under conditions of semi-darkness. The device of the present invention can easily be operated in complete darkness. The timing is exact and any reasonable length of time desired can be easily and quickly selected. Any maximum length of time for one particular machine can be obtained by the provision of proper gearing.

Figure 1:
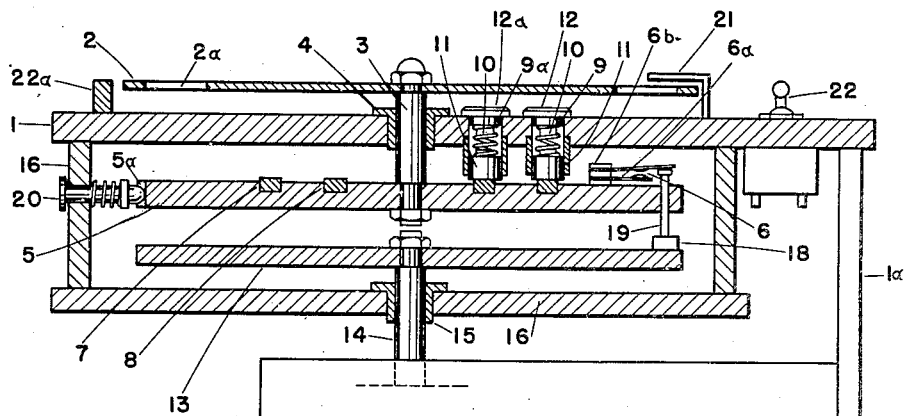
Figure 1 is a diagrammatic vertical section of a machine embodying the invention.
Figure 4:
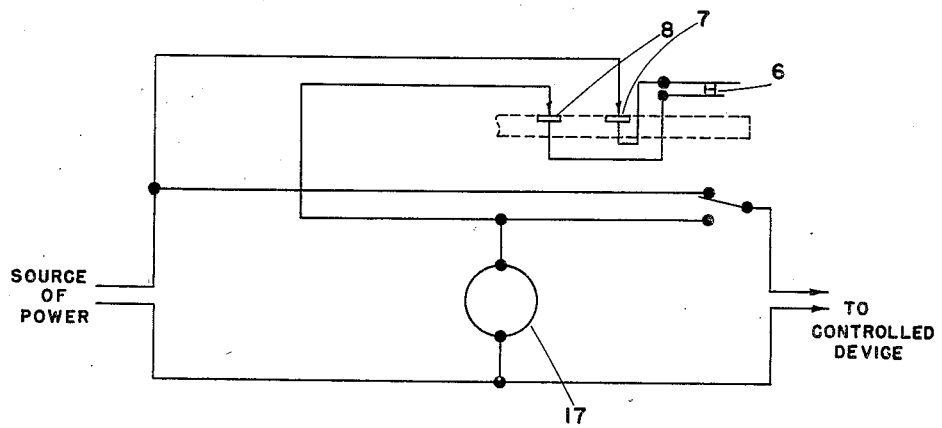
Figure 4 is a schematic wiring diagram of the electrical circuits.

Referring to the drawings, the entire mechanism is mounted on a plate or support member 1, which for use, may desirably be mounted on a side 1a of a box, and preferably consists of a rotary dial 2, made of plastic or any other suitable substance. Dial 2 desirably has sixteen (16) holes or manual engaging portions 2a around its outer edge, these holes or engaging portions being adapted to be used as selective dialing means. Dial 2 is mounted on a rotary shaft 3, which is supported by bearing 4 in the support member 1. Also attached to the rotary shaft 3 is disc 5, preferably positioned below plate 1. Disc 5 may desirably carry a set of electrical contact points 6, and commutator means comprising slip rings 7 and 8. The contact points 6 may desirably be mounted on spring arm members 6a fixed to the disc 5 at post 6b. Brush assemblies are provided, each consisting of the barrels 9 and 9a, springs 10 and 10a, brushes 11, 11a and spring retaining discs 12 and 12a. The brush assemblies provide for making electrical contact with the contact points 6, said points being wired to the commutator rings as indicated in Fig. 4. Thus when disc 5 is turned to any position, brushes 11 and 11a will maintain constant contact with the commutator rings.

A disc 13 is provided, mounted on a rotary shaft 14, which is supported by bearing 15 mounted in a support 16 which may desirably depend from the plate 1. The disc 13 is thus mounted in juxtaposition to disc 5. Disc 13 is desirably rotated in a clockwise direction with relation to disc 5 and dial 2 by an electric motor 17 driving shaft 14. The length of running time of the motor and the distance through which the disc 13 is turned thereby, will depend on the limit of time selected by the operator of dial 2.

The disc 13 supports a cam 18, so arranged that when, with disc 13 moving and disc 5 stationary, the cam 18 will intercept the lower end of a plunger 19 extending through the disc 5 for separating engagement with one of said contact arms 6a, thereby forcing said plunger 19 upward and exerting pressure in an upward direction against one arm 6a of the contact points 6, resulting in the separation of the contact points and opening the electrical circuit. The engagement of the cam 18 with the lower end of the plunger 19 and the consequent separation of the contact points results in the immediate stopping of the motor 17 and in the immediate stopping of the rotation of disc 13, which in this position holds the contact points open indefinitely.

Detent means are provided, comprising a spring detent 20 mounted on support member 16 to engage detent recesses 5a on the periphery of disc 5, the detent recesses on disc 5 being of the same number and corresponding with the finger engaging portions or holes 2a in the dial 2. The spring detent 20 is so located that when a finger hole in dial 2 is located at its stop point with respect to the finger stop 21, the detent will enter a detent recess. The pressure exerted by the detent spring against disc 5 will hold dial 2 in the position as placed by the operator.

The electrical connections, as illustrated in Figure 4, show that when electric contacts 6 are closed, current is supplied to the electric motor 17 and an external or controlled device. However, when electrical contacts 6 are opened, no current will be supplied to the electric motor or external device.

For the purpose of illustrating the action embodied in this device, the speed of the electric motor desirably may be such that disc 13 will be turned one revolution in sixteen (16) seconds, for example, and sixteen (16) finger holes are located in dial 2. With current supplied, the electric motor 17 will turn disc 13 until the motor is automatically turned off by cam 18 separating the contact points 6. The device to be controlled is connected in parallel with the electric motor 17 as indicated in Fig. 4.

In operating the device by means of the finger holes in dial 2, as an example, the ninth finger hole, counting counter-clockwise from the finger hole then at the finger stop 21, may be brought to the finger stop. As soon as dial 2 is moved, moving also disc 5 with its plunger 19 beyond the cam 18 of disc 13, the contact points 6 are closed, thus supplying current to the electric motor 17 and the external device connected in parallel to the electric motor 17. Disc 13 will then be turned until contacts 6 are opened. The length of time current is supplied to motor 17 will depend upon the distance dial 2 has been turned. With the assumed conditions, dialing by the ninth finger hole would have moved the dial eight-sixteenths of a revolution, and since sixteen seconds are required for a full turn, current would have been supplied eight seconds. The amount of time thus depends on which finger hole is dialed.

Figure 5:
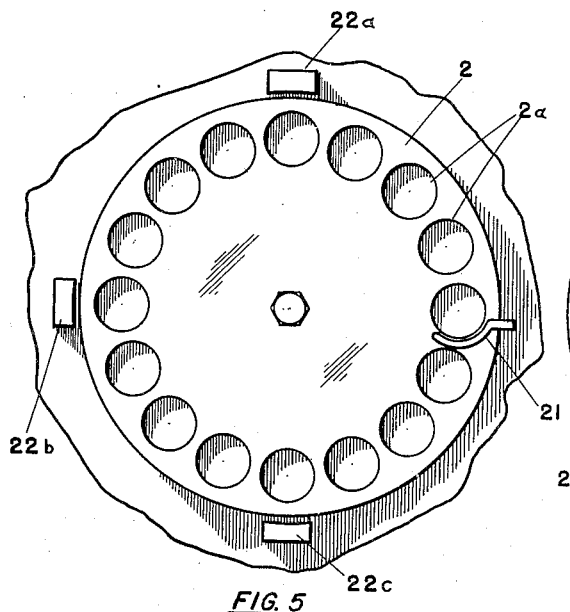
Figure 5 is a plan view of dial 2.

Indicator or feeler blocks, or the like, 22a, 22b, 22c (Figure 5), are preferably located at the edge of dial 2 desirably at 90 degree intervals with respect to the finger stop arm 21. The operator can then locate the desired finger hole by sense of touch, using said feeler blocks for orientation.

For the convenience of the operator, a switch 22 may desirably be provided, which permits manual control of the electrical current to the external device without the use of the selective timing device.

Figure 6:
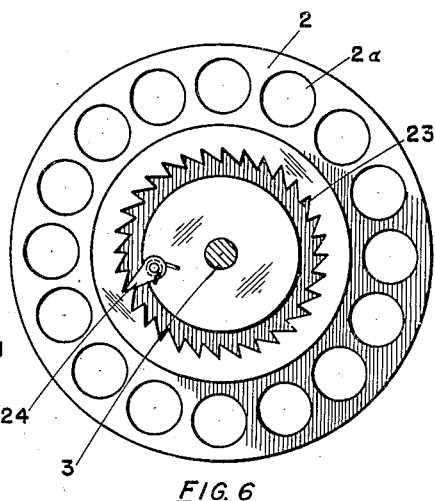
Figures 6 and 7 show a modification.
Figure 3A:
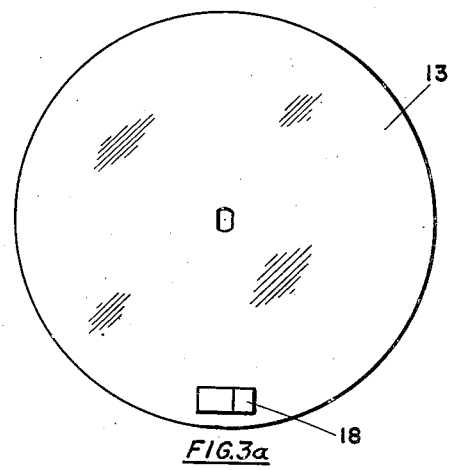
Figure 3a is an elevation of disc 13.
Figure 2:
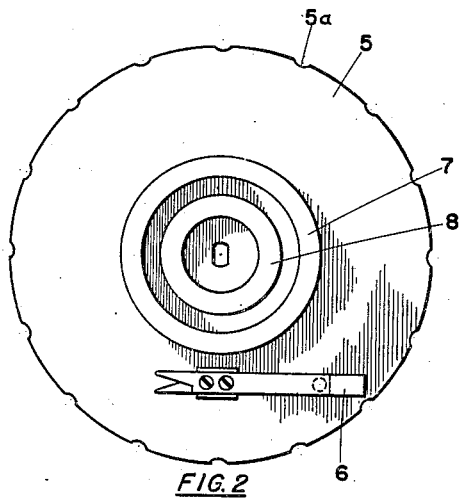
Figure 2 is a plan view of disc 5.
Figure 3:
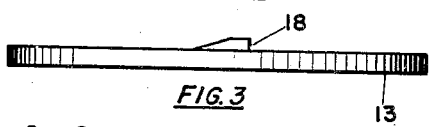
Figure 3 is a plan view of disc 13.
Figure 7:
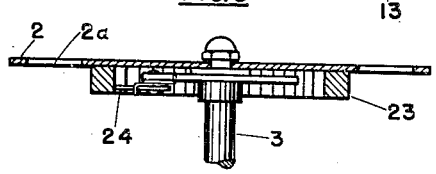

Preferably, means are provided enabling the addition of half seconds to any number of seconds. This may desirably comprise a ratchet 23 provided on the dial 2, as shown in Fig. 6, and a spring-pressed pawl 24 so mounted as to be carried around with the shaft 3. The dial 2 in this modification is mounted to turn freely on the shaft 3. When the dial is turned in a clockwise direction, the ratchet on the dial will engage the pawl 24 and will turn the shaft 3. The ratchet 23 contains twice as many teeth as there are finger holes on the dial. This arrangement permits the operator to dial an even number of seconds clockwise until a finger hole is at the stop 21, and then to turn the dial back in an anti-clockwise direction for one click or tooth of the ratchet, and then to turn it clockwise again until the finger hole is again at the stop 21, thus dialing the additional half second and adding the half second to the time dialed.

The device of the present invention eliminates the need for any re-setting of the dial and no numbering of marking of the finger holes or other indicia is provided on the dial. The relation of the parts is such that with any manual engaging dial portion or finger hole located at the stop 21, and with the contacts separated by the cam, the device may be put in operation by dialing the desired time setting by means of any other finger hole, the number of which, counting from the stop 21, is readily determined by the indicator blocks or members such as 22a, 22b, and 22c disclosed around the edge of the dial. The device will then operate to provide electric current to the external controlled device. The plunger operating the electric contact points on disc 5, having been moved away from the cam 18 of disc 13, a distance corresponding to the extent of the manual dialing operation, the motor driving the disc 13 is operated by reason of the closed contacts until the cam 18 overtakes the plunger of the set disc 5, to open the contacts again.

The invention described herein may be manufactured and used by or for the Government of the United States of America for governmental purposes without the payment of any royalty thereon or therefor.

What is claimed is:

1. A device for controlling the duration of electric current comprising a mounting plate, an opening in said mounting plate, a rotatable shaft inserted in said opening, a selective manually operated dial fixed to said shaft and positioned on one side of said mounting plate, a disc fixed to said shaft on the other side of said mounting plate, commutator rings mounted in said disc, brushes mounted on said mounting plate in engagement with said commutator rings, contact points mounted on said disc and electrically connected to said commutator rings, said disc having a hole therethrough adjacent to said contact points, a plunger extending through said hole in said disc and in engagement with one of said contact points, a power driven shaft, a second disc fixed thereon, a cam so positioned on said disc as to engage and move said plunger toward said contact points during rotation of said second disc relative to said first mentioned disc, and detent means for holding said dial and first mentioned disc in selected position, said detent means comprising a spring detent supported by the mounting plate, and detent recesses in the periphery of said first mentioned disc to receive said detent.

2. A device for controlling the duration of electric current comprising a mounting plate, said mounting plate mounting a spring detent means, an opening in said mounting plate, a rotatable shaft inserted in said opening, a selective manually operated dial fixed to said shaft and positioned on one side of said mounting plate, a disc fixed to said shaft on the other side of said mounting plate, detent means formed on the periphery of said disc to engage said spring detent on the mounting plate, commutator rings mounted on said disc, brushes mounted on said mounting plate in engagement with said commutator rings, contact points mounted on said disc, said disc having a hole therethrough, a plunger extending through the hole and in engagement with one of said contact points, a power driven shaft, a second disc thereon, a cam so positioned on said disc as to engage and move said plunger toward said contact points during rotation of said second disc relative to said dial and first mentioned disc, finger recesses in said dial, a finger stop mounted adjacent said dial, and indicator means positioned adjacent the dial for selective dialing.

3. A device for controlling the duration of electric current comprising a mounting plate, said mounting plate mounting a spring detent means, an opening in said mounting plate, a rotatable shaft inserted in said opening, a selective manually operated dial fixed to said shaft and positioned on one side of said mounting plate, a disc fixed to said shaft on the other side of said mounting plate, detent means formed on the periphery of said disc to engage said spring detent on the mounting plate, commutator rings mounted on said dics, brushes mounted on said mounting plate in engagement with said commutator rings, contact points mounted on said disc, said disc having a hole therethrough, a plunger extending through the hole and in engagement with one of said contact points, a power driven shaft, a second disc thereon, a cam so positioned on said disc as to engage and move said plunger toward said contact points during rotation of said second disc relative to said dial and first mentioned disc, finger recesses in said dial, a finger stop mounted adjacent said dial, and indicator means positioned adjacent the dial for selective dialing, said finger recesses being spaced apart a distance corresponding to a unit of time, and said indicator means comprising indicator members spaced apart around the outside of the periphery of said dial, said dial being free from indicia.

4. A device for controlling the duration of electric current comprising a mounting plate, said mounting plate mounting a spring detent means, an opening in said mounting plate, a rotatable shaft inserted in said opening, a selective manually operated dial fixed to said shaft and positioned on one side of said mounting plate, a disc fixed to said shaft on the other side of said mounting plate, detent means formed on the periphery of said disc to engage said spring detent on the mounting plate, commutator rings mounted on said disc, brushes mounted on said mounting plate in engagement with said commutator rings, contact points mounted on said disc, said disc having a hole therethrough, a plunger extending through the hole and in engagement with one of said contact points, a power driven shaft, a second disc thereon, a cam so positioned on said disc as to engage and move said plunger toward said contact points during rotation of said second disc relative to said dial and first mentioned disc, finger recesses in said dial, a finger stop mounted adjacent said dial, and indicator means positioned adjacent the dial for selective dialing, said finger recesses being spaced apart a distance corresponding to a unit of time, and means providing for the addition of half units of time comprising a ratchet mounted on said dial, a pawl mounted for movement with said first mentioned shaft and positioned to engage said ratchet, said dial being freely mounted on said first mentioned shaft, said ratchet having two ratchet teeth to each finger recess in the dial, thereby providing for the dialing of a half unit of time.

5. A device for controlling the duration of electric current so constructed as to eliminate the need for resetting for successive operations, comprising a selective manually operated rotary dial, finger holes in said dial, a finger stop mounted adjacent the dial, indicator means fixed adjacent said dial, a disc mounted for rotation with said dial, detent means for holding a selected position of said dial and disc, a power shaft mounting a second disc, said second disc being rotated relative to said dial and first said disc, electric circuit contact means mounted on one of said discs, and means on the other of said discs for making and breaking said electric contact means upon relative rotation between said discs.

6. A device for controlling the duration of electric current so constructed as to eliminate the need for resetting for successive operations, comprising a selective manually operated rotary dial, uniformly spaced finger recesses in said dial, a finger stop mounted adjacent said dial, indicator means fixed adjacent said dial, a disc mounted for rotation with said dial, detent means for holding a selected position of said dial and disc, a power shaft mounting a second disc, said second disc being rotatable relative to said dial and said first disc, electric circuit contact means mounted on said first disc, means on the said second disc for making and breaking said electric contact means upon relative rotation between said discs, the electric circuit being broken and the said discs being arranged to be at rest in any rotary position of said first disc when the said means on said second disc is in engagement with said electric circuit contact means on said first disc, and the electric circuit being made so as to drive said second disc upon manual rotation of said first disc from the position of rest or engagement to a selected position by manually engaging any selected finger recess in said dial and rotating said dial and first disc to bring said selected finger recess to said finger stop, said second disc being mounted to be driven in a direction to overtake said first disc and dial and to break the electrical circuit with the dial and first disc in said selected position.

RALPH V. ANDERSON.

REFERENCES CITED

The following references are of record in the file of this patent:

UNITED STATES PATENTS

| Number | Name | Date |
| --- | --- | --- |
| 2,275,143 | Hanks | Mar. 3, 1942 |

FOREIGN PATENTS

| Number | Country | Date |
| --- | --- | --- |
| 79,746 | Austria | Jan. 10, 1920 |